United States Patent
Swanson et al.

(10) Patent No.: US 10,296,021 B2
(45) Date of Patent: May 21, 2019

(54) MONITOR FOR ACTIVE VIBRATION CONTROL

(71) Applicants: LORD CORPORATION, Cary, NC (US); Doug A. Swanson, Cary, NC (US); Paul R. Black, Fuquay-Varina, NC (US); David Clark, Apex, NC (US); Matthew K. Ferguson, Fairview, PA (US); Jihan Ryu, Cary, NC (US)

(72) Inventors: Doug A. Swanson, Cary, NC (US); Paul R. Black, Fuquay-Varina, NC (US); David Clark, Apex, NC (US); Matthew K. Ferguson, Fairview, PA (US); Jihan Ryu, Cary, NC (US)

(73) Assignee: LORD Corporation, Cary, NC (US)

( * ) Notice: Subject to any disclaimer, the term of this patent is extended or adjusted under 35 U.S.C. 154(b) by 375 days.

(21) Appl. No.: 14/759,240

(22) PCT Filed: Jan. 17, 2014

(86) PCT No.: PCT/US2014/012044
§ 371 (c)(1),
(2) Date: Jul. 6, 2015

(87) PCT Pub. No.: WO2014/113666
PCT Pub. Date: Jul. 24, 2014

(65) Prior Publication Data
US 2015/0346739 A1 Dec. 3, 2015

Related U.S. Application Data

(60) Provisional application No. 61/754,163, filed on Jan. 18, 2013.

(51) Int. Cl.
*G05D 19/02* (2006.01)
*B64C 27/00* (2006.01)
(Continued)

(52) U.S. Cl.
CPC .......... *G05D 19/02* (2013.01); *B64C 27/001* (2013.01); *G05B 15/02* (2013.01); *G01H 1/00* (2013.01); *G10K 2210/1291* (2013.01)

(58) Field of Classification Search
CPC ...... G05D 19/02; G05B 15/02; B64C 27/001; G10K 2210/1291; G01H 1/00
See application file for complete search history.

(56) References Cited

U.S. PATENT DOCUMENTS 4,946,354 A * 8/1990 Aubry ................... B64C 27/54
416/157 A
5,961,899 A * 10/1999 Rossetti ................. B21B 37/007
100/168

(Continued)

FOREIGN PATENT DOCUMENTS

EP 0 541 277 5/1993

OTHER PUBLICATIONS

Gray, R.B.; Schrage, D.P.; Armanios, E.A.; Calise, A.J.; Craig, J.I.; Hanagud, S.V.; Hodges, D.H.; Komerath, N.M.; McKeithan, C.M.; Peters, D.A.; Pierce, G.A.; Prasad, J.V.R.; Sankar, L.N.; Wang, C. and Wu, J.C., "A Center of Excellence in Rotary Wing Aircraft Technology Final Report", Jan. 15 1988 to Jan. 14, 1993.*

(Continued)

*Primary Examiner* — Mohammad Ali
*Assistant Examiner* — Kelvin Booker

(57) ABSTRACT

The present subject matter relates to systems and methods for active vibration control system speed monitoring and control in which a speed protection monitor configured to receive index pulses as inputs to monitor the speed of one or more force generators. A rotary actuator control system can be connected in communication with the speed protection monitor and the one or more force generators, wherein the rotary actuator control system is configured to shut down or adjust the speed of the one or more force generators if the (Continued)

one or more force generators are determined to be operating at undesired speeds.

31 Claims, 12 Drawing Sheets

(51) Int. Cl.
  *G01H 1/00* (2006.01)
  *G05B 15/02* (2006.01)

(56) References Cited

U.S. PATENT DOCUMENTS

| | | | | |
|---|---|---|---|---|
| 6,450,393 | B1* | 9/2002 | Doumanidis | B23P 15/00 |
| | | | | 228/110.1 |
| 6,837,106 | B2* | 1/2005 | Etkin | G01N 7/16 |
| | | | | 73/382 G |
| 9,583,991 | B2* | 2/2017 | Iannello | F16C 32/0442 |
| 9,623,962 | B2* | 4/2017 | Swanson | B64C 27/001 |
| 2004/0075020 | A1* | 4/2004 | Trikha | B64C 13/42 |
| | | | | 244/99.4 |
| 2004/0207247 | A1* | 10/2004 | Jackson | E21C 25/16 |
| | | | | 299/85.1 |
| 2005/0099084 | A1* | 5/2005 | Fletcher | G01H 1/00 |
| | | | | 310/195 |
| 2006/0151272 | A1* | 7/2006 | Smith | B64C 27/001 |
| | | | | 188/378 |
| 2007/0156289 | A1 | 7/2007 | Altieri et al. | |
| 2007/0293366 | A1* | 12/2007 | Landes | F16H 61/16 |
| | | | | 477/34 |
| 2011/0208361 | A1* | 8/2011 | Hildebrand | G05B 19/404 |
| | | | | 700/280 |
| 2012/0326450 | A1* | 12/2012 | Smith | F03D 1/025 |
| | | | | 290/1 C |
| 2013/0220074 | A1* | 8/2013 | Benjamin | F04B 19/20 |
| | | | | 74/99 R |
| 2014/0034848 | A1* | 2/2014 | Campbell | F03G 6/00 |
| | | | | 250/492.1 |
| 2014/0050580 | A1* | 2/2014 | Hagen | F03D 7/0208 |
| | | | | 416/1 |
| 2014/0244051 | A1* | 8/2014 | Rollins | G05D 27/02 |
| | | | | 700/282 |
| 2015/0307186 | A1* | 10/2015 | Swanson | B64C 27/001 |
| | | | | 701/3 |
| 2015/0345473 | A1* | 12/2015 | Bardia | F03D 9/25 |
| | | | | 290/44 |

OTHER PUBLICATIONS

Tilmann, C.P.; Kimmel, R.L.; Addington, G.A. And Myatt, J.H., "Flow Control Research and Applications at the AFRL's Air Vehicles Directorate", Jun. 28-Jul. 1, 2008, $2^{nd}$ AIAA Flow Control Conference.*

Miljković, D., "Review of Active Vibration Control", MIPRO 2009. (Year: 2009).*

* cited by examiner

| TRUTH TABLE FOR LOGIC | | | | | | | |
|---|---|---|---|---|---|---|---|
| | OVER VIB | UNDER V | ENABLE | LATCH | LATCH/UND | OVER V | ENABLE/OK |
| UNDER SPEED LOGIC | | | | | | | |
| UNDER | TRUE | FALSE | FALSE | FALSE | TRUE | TRUE | TRUE |
| ABOVE MIN | TRUE | TRUE | FALSE | FALSE | TRUE | TRUE | TRUE |
| ABOVE ENABLE | TRUE | TRUE | TRUE | TRUE | TRUE | TRUE | TRUE |
| DROPPED | TRUE | TRUE | FALSE | TRUE | TRUE | TRUE | TRUE |
| BELOW MIN | TRUE | FALSE | FALSE | TRUE | FALSE | TRUE | FALSE |
| OVER SPEED LOGIC | | | | | | | |
| UNDER | TRUE | FALSE | FALSE | FALSE | FALSE | TRUE | TRUE |
| ABOVE MIN | TRUE | TRUE | FALSE | FALSE | TRUE | TRUE | TRUE |
| ABOVE ENABLE | TRUE | TRUE | TRUE | TRUE | TRUE | TRUE | TRUE |
| OPERATING | TRUE | TRUE | TRUE | TRUE | TRUE | TRUE | TRUE |
| OVER VOLTAGE | TRUE | TRUE | TRUE | TRUE | TRUE | FALSE | FALSE |
| OVER VIBRATION | | | | | | | |
| UNDER | TRUE | FALSE | FALSE | FALSE | TRUE | TRUE | TRUE |
| ABOVE MIN | TRUE | TRUE | FALSE | FALSE | TRUE | TRUE | TRUE |
| ABOVE ENABLE | TRUE | TRUE | TRUE | TRUE | TRUE | TRUE | TRUE |
| OPERATING | TRUE | TRUE | TRUE | TRUE | TRUE | TRUE | TRUE |
| OVER VIB | FALSE | TRUE | TRUE | TRUE | TRUE | TRUE | FALSE |

FIG. 6C

MONITOR FOR ACTIVE VIBRATION CONTROL

CROSS REFERENCE TO RELATED APPLICATION

The present application claims the benefit of U.S. Provisional Patent Application Ser. No. 61/754,163, filed Jan. 18, 2013, the disclosure of which is incorporated herein by reference in its entirety.

TECHNICAL FIELD

The subject matter disclosed herein relates generally to active vibration control system force magnitude, speed and vibration monitoring and control.

BACKGROUND

A common problem that is encountered in vehicles such as fixed wing or rotary wing aircraft is unwanted vibration forces that are induced into the vehicle frame by imbalance forces of rotating machines. One method that has been developed to address these unwanted vibrations is to generate controlled vibration cancellation forces by spinning motors equipped with specified imbalance masses. These motors, or rotary actuators, are controlled to operate synchronously with the vibration frequencies to produce imbalance reaction forces such that a desired vibration cancellation effect is produced. The rotary actuators can have safety concerns because it is possible for faults in the electronic control system to cause the cancellation forces to shake the vehicle structure at an unintended frequency or incorrect magnitude or phase. Such errant rotating forces can increase vibration (e.g., by exciting resonances in the vehicle) and result in out of limits, unsafe operating conditions, structural damage or even catastrophic loss.

The potential of the electronic control system to command the rotary actuators to produce forces at prohibited (undesired) magnitude, phase or frequencies and the critical safety implications of the vehicle structure being excited at those frequencies combine to impose a flight critical, or Level A, classification of the control system. The flight critical classification mandates the need for an independent monitoring system with the capability to detect the undesired force magnitude, phase, speed and/or vibration condition and the authority to disable the rotating forces if the condition does not clear within some period of time or number of cycles. A Level C condition constitutes a significant reduction in safety margins or functional capabilities, a significant increase in crew workload or conditions impairing crew efficiency, and/or some discomfort to the occupants.

SUMMARY

In accordance with this disclosure, systems and methods for active vibration control system force, speed, and/or vibration monitoring and control are provided. In one aspect, a system for active vibration control system force, speed, and/or vibration monitoring and control is provided. The system comprises a protection monitor configured to receive index pulses as inputs to monitor the speed and force of one or more force generators. Accelerometers are used to monitor vibration and provide data to the controller so that system protects against high vibration in the force generator and/or aircraft structure. A rotary actuator control system is connected in communication with the force, speed, and/or vibration protection monitor and the one or more force generators, wherein the rotary actuator control system is configured to shut down or adjust the speed or force of the one or more force generators if the one or more force generators are determined to be operating at undesired conditions including undesired forces, speeds and/or vibration.

In another aspect, a method for active vibration control system force, speed and/or vibration monitoring and control is provided. The method comprises receiving index pulses as inputs to a protection monitor to monitor the speed and force of one or more force generators. The index pulses can be compared to one or more reference values, and the one or more force generators can be shut down or have their speed or force adjusted if the one or more force generators are determined to be operating at undesired conditions including undesired forces, speeds and/or vibration. Accelerometers are used to protect against high vibration in the force generator and/or aircraft structure.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

FIG. 6c illustrates a truth table for logic of a hardware-only active vibration control system speed monitoring and control system according to an embodiment of the presently disclosed subject matter.

DETAILED DESCRIPTION

Numerous objects and advantages of the subject matter will become apparent as the following detailed description of the preferred embodiments is read in conjunction with the drawings, which illustrate such embodiments.

The present subject matter provides devices, systems, and methods for active vibration control system force, speed and vibration monitoring and control. Reference will be made in detail to possible aspects or embodiments of the subject matter herein, one or more examples of which are shown in the figures. Each example is provided to explain the subject matter and not as a limitation. In fact, features illustrated or described as part of one embodiment can be used in another embodiment to yield still a further embodiment. It is intended that the subject matter disclosed and envisioned herein covers such modifications and variations.

As discussed above, the flight critical classification of the electronic control system for the circular force generator (CFG) mandates the need for an independent monitoring system with the capability to detect unauthorized (undesired) force, speed and/or vibration conditions and the authority (desire) to disable the rotating forces if the condition does not clear within some period of time or number of cycles. As used herein, forbidden, unauthorized, prohibited or undesired conditions are conditions that exceed operating or performance limits related to safety. A non-limiting example is when a device exceeds a operating limit such that it the operation of the device creates an unsafe flight condition.

Figure 1A:
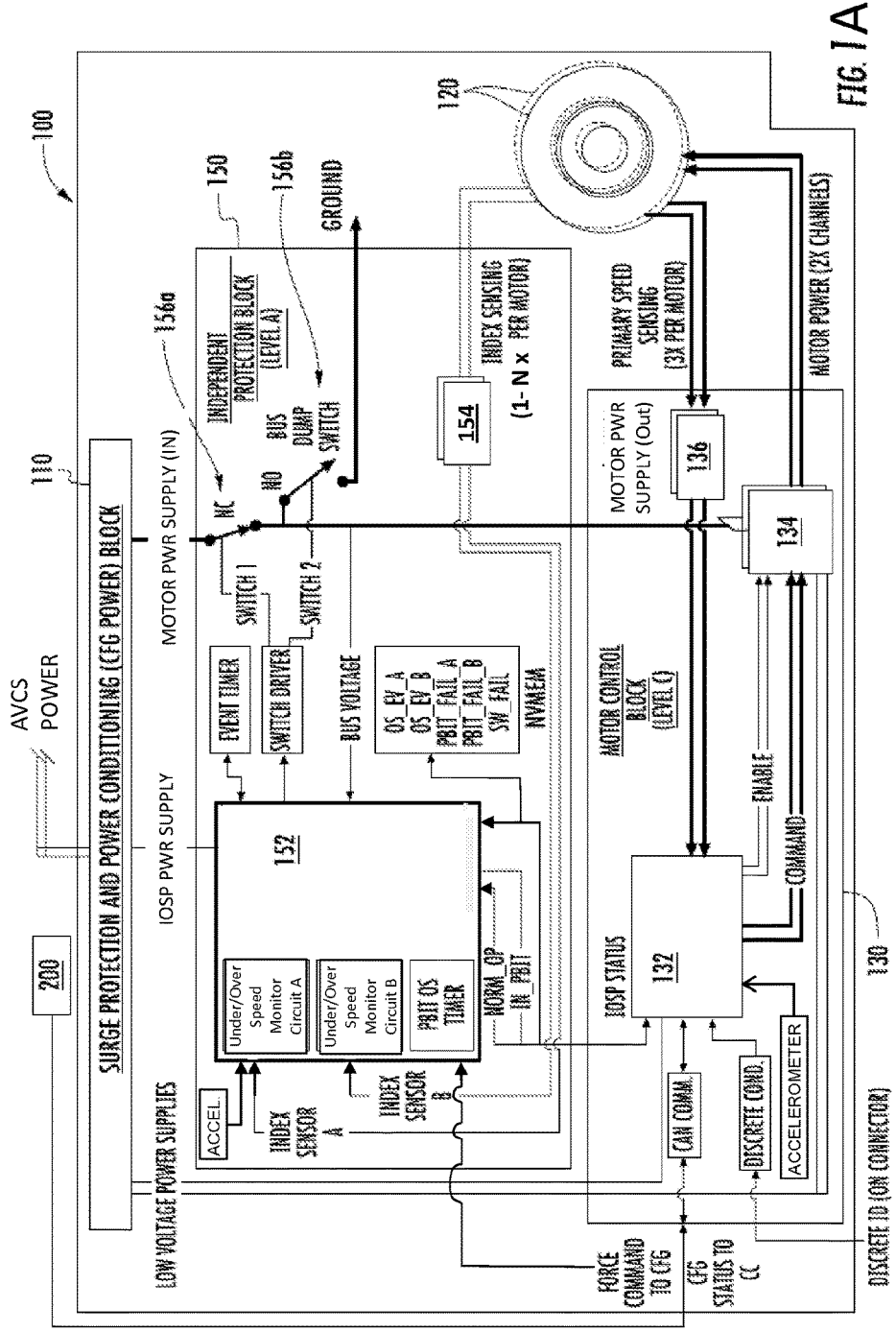
FIGS. 1A and 1B illustrate a block diagram of an active vibration control system force, speed and vibration monitoring and control system according to an embodiment of the presently disclosed subject matter.
Figure 6A:
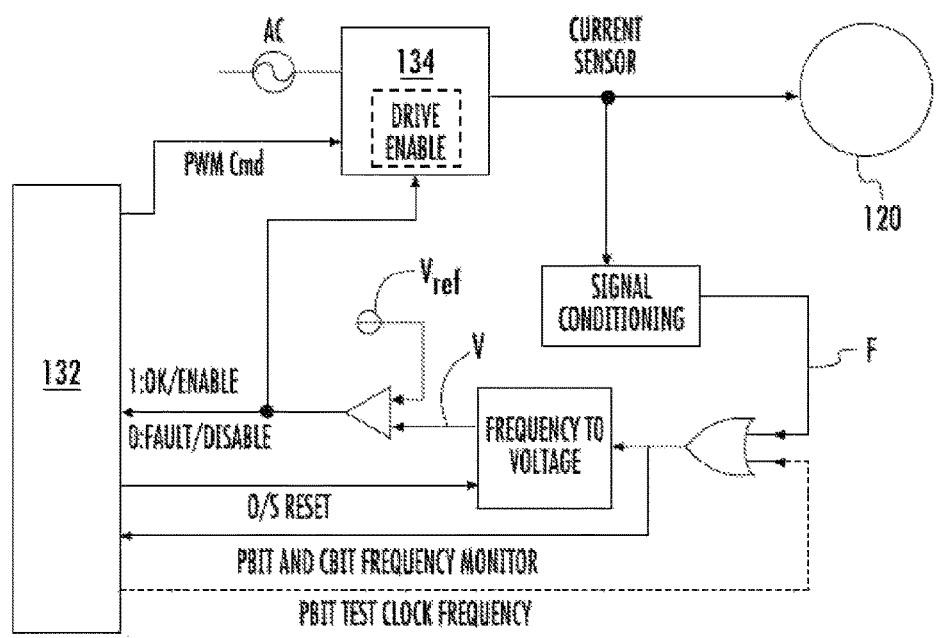
FIGS. 6a and 6b illustrate block diagrams of hardware-only active vibration control system speed monitoring and control systems according to embodiments of the presently disclosed subject matter.
Figure 6B:
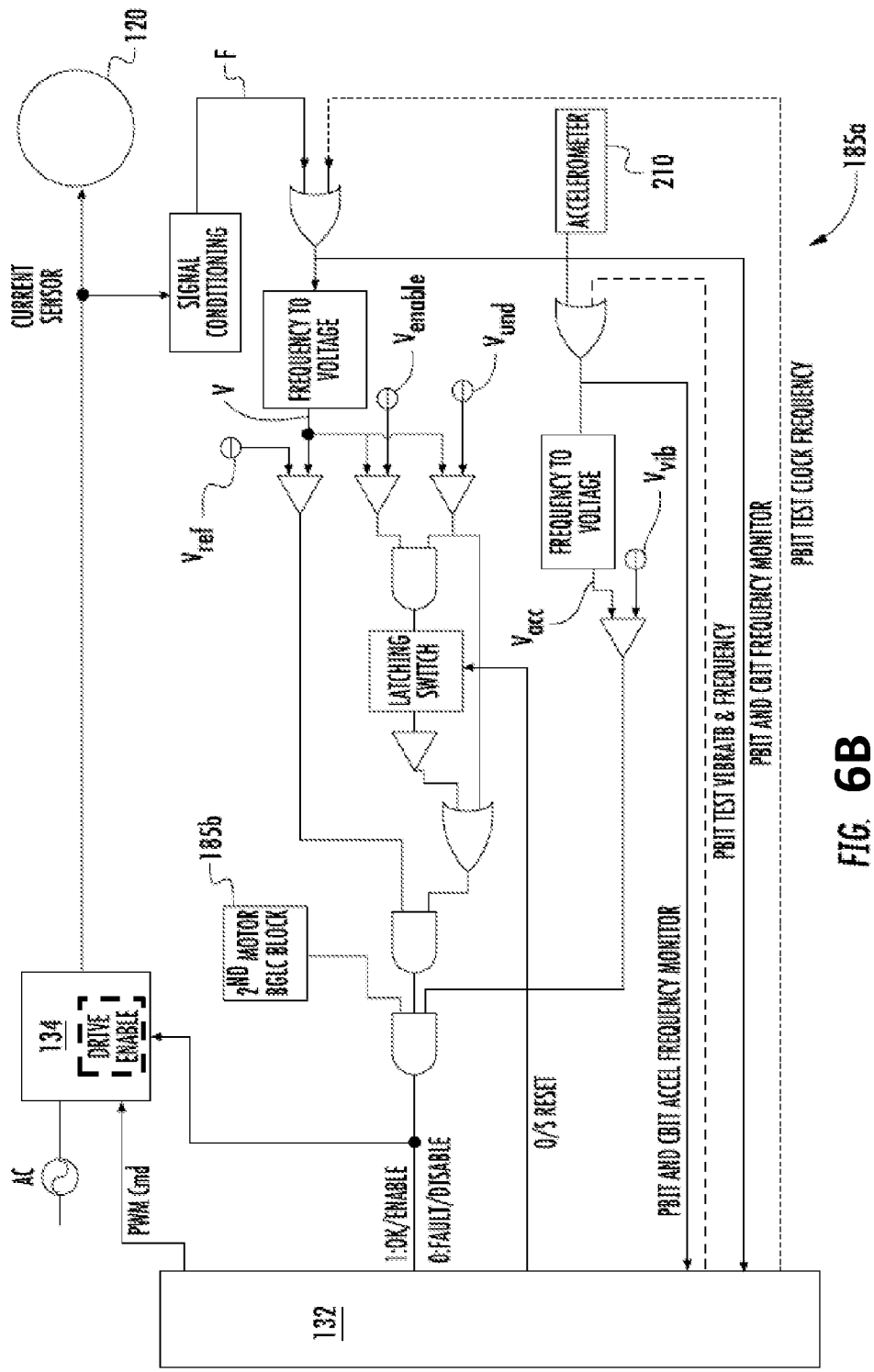

FIGS. 1A 6B have numerous common elements in the various embodiments therein. Those common elements are intended to incorporate the earlier described functionalities unless there is an alternative description provided for that particular Figure.

Figure 1B:
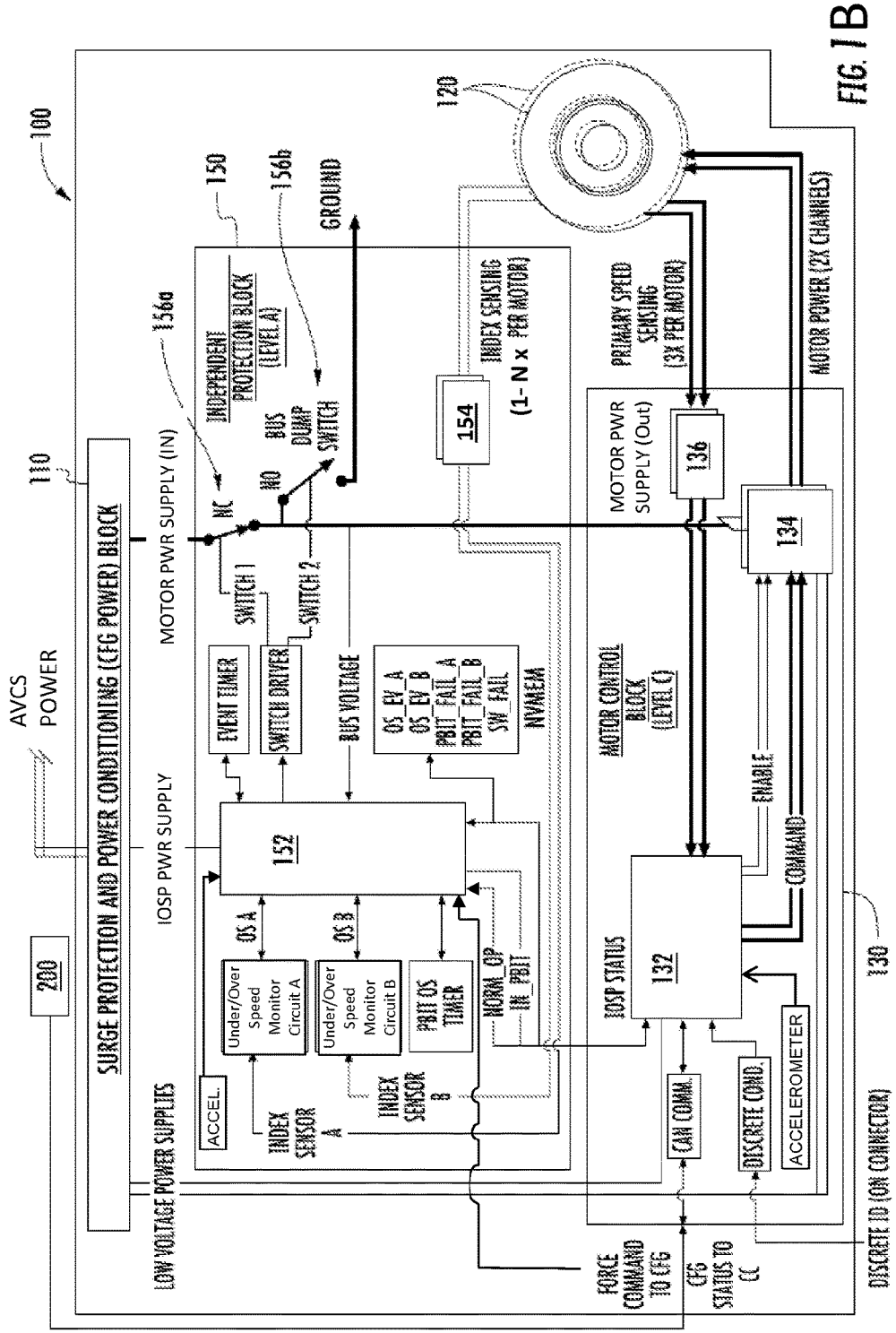

FIGS. 1A and 1B illustrate block diagrams for two possible embodiments of an independent force, speed and vibration monitor in a rotating actuator control system. In these embodiments, the independent force, speed, and vibration monitor are contained within the CFG, generally designated 100. As shown, the CFG 100 comprises power conditioning circuit elements 110, a rotary actuator control block 130, and an independent monitoring system 150 that are together configured to monitor and control the operation of one or more rotary actuators 120 (e.g. motors driving the rotation of imbalance masses).

The rotary actuator control block 130, or the Motor Control Block, represents a Level C system. The rotary actuator control block 130 comprises a Digital Signal Processor (DSP) controller 132, rotary actuator drive circuitry 134, at least one accelerometer and any primary speed sensors 136. As illustrated, the rotary actuator control block 130 further includes a CAN Communication and a Discrete Condition. The CAN Communication receives force commands and frequency information from the AVCS controller. Across the digital interface, the controller and CFG's can also send information related to CFG speed, actual force, CFG status. The Discrete Condition is used by the AVCS controller to identify the CFG location on the CAN bus in a situation where there are multiple CFG's. The rotary actuator control block 130 receives CFG status to transmit to the central controller (CC).

DSP controller 132 is in electronic communication with rotary actuator drive circuitry 134. Motor Power Supply (In) and Low Voltage Power Supplies provide electrical power through rotary actuator drive circuitry 134. As illustrated the Motor Power is communicated actuator 120 in at least two channels.

Primary Sensing Speed, with at least one sensor, is sampled at least three times per motor by primary speed sensors 136. As illustrated, a three-phase brushless DC motor is used requiring at least three independent primary speed sensors 136 which are mounted in the motors to commutate (drive) the motors. Primary speed sensors 136 are in electronic communication with actuator 120 and the motors thereon. Primary speed sensors 136 are also in electronic communication with DSP controller 132.

The combination of the Level C command and Level A monitor together comprise the Level A system. In the embodiment illustrated, the combination of the rotary actuator control block 130 with the independent monitoring system 150, or the Independent Protection Block, represents a Level A system. The independent monitoring system 150 shown in FIGS. 1A and 1B comprises at least index sensors A and B, digital processing integrated circuit 152, supplementary speed sensor 154, switch 156a, parallel switch 156b. Additionally, the independent monitoring system 150 comprises non-volatile memory (NVMEM), Event Timer, Switch Driver, at least one accelerometer, Underspeed/Overspeed Monitor Circuits A and B (Under/Over Monitor Circuit), and a Power-Up Built-In Test (PBIT) Under/Over (OS) Timer. The digital processing integrated circuit 152 receives and sends input/output signal processing (IOSP) status between it and the DSP controller 132. Also, digital processing integrated circuit 152 receives Force Commands from the command or Central Controller. Digital processing integrated circuit 152 compares force commands with actual force.

Index sensing from actuator 120 and the motors thereon is electronically communicated to the supplementary speed sensor 154. There can be 1-N index sensors associated with actuator 120 and the motors thereon. In one embodiment, there are three index sensors associated with actuator 120 and the motors thereon. In another embodiment there are two index sensors associated with actuator 120 and the motors thereon. In another embodiment, there are four index (speed) sensors (four speed sensors or an encoder is used to estimate force). The index sensor and the supplementary speed sensor 154 are in electronic communication with Underspeed/Overspeed Monitor Circuits A and B. As illustrated in FIGS. 1A and 1B, Index Sensor A is in electronic communication with Underspeed/Overspeed Monitor Circuit A, and Index Sensor B is in electronic communication with Underspeed/Overspeed Monitor Circuit B.

The NVMEM receives electronic input from Underspeed/Overspeed Monitor Circuits A and B, PBIT OS Timer, and IOSP Status from DSP Controller 132.

In embodiment illustrated in FIG. 1A, the digital processing integrated circuit 152 carries Underspeed/Overspeed Monitor Circuits A and B (Under/Over Monitor Circuit) and PBIT Timer thereon with input from at least one accelerometer, Index Sensors A and B, Force Command to CFG, IOSP Status from DSP Controller 132, and the Event Timer. In the embodiment illustrated in FIG. 1B, the digital processing integrated circuit 152 receives input from Underspeed/Overspeed Monitor Circuits A and B (Under/Over Monitor Circuit), PBIT Timer, at least one accelerometer, Index Sensors A and B, Force Command to CFG, IOSP Status from DSP Controller 132, and the Event Timer.

The independent monitoring system 150 shown in FIGS. 1A and 1B comprise at least index sensors A and B, digital processing integrated circuit 152, supplementary speed sensor 154, switch 156a, parallel switch 156b. Additionally, the independent monitoring system 150 comprises non-volatile memory (NVMEM), Event Timer, Switch Driver, at least one accelerometer, Underspeed/Overspeed Monitor Circuits A and B (Under/Over Monitor Circuit), and a PBIT timer.

Referring to FIGS. 1A and 1B, the independent form for force, speed and vibration monitoring system 150 takes dedicated index sensing pulses (also referred to herein as index pulses) from the rotary actuators 120 as well as inputs from internal accelerometers as inputs to monitor the force and/or speed of the rotary actuators by using one or more supplementary speed sensor 154 to receive these index pulses. Index pulses may also be from embedded sensors such as embedded strain gauges.

In this non-limiting example, the supplementary speed sensor 154 comprises a single Hall-effect sensor per rotary actuator that generates a pulse upon each revolution of a respective one of rotary actuators 120. Such a supplementary speed sensor 154 can be independent of any primary speed sensors 136 (e.g., three Hall-effect sensors per rotary actuator) that are commonly used to monitor the operation of the rotary actuators 120 as part of a normal feedback-based control of the rotary actuators 120. The index pulses can be directly connected (i.e., wired) to monitoring system 150, or they can be transmitted wirelessly. Once received by monitoring system 150, the index pulses are preferably processed in a digital processing integrated circuit 152. A non-limiting example of digital processing integrated circuit 152 includes a Complex Programmable Logic Device (CPLD), a Field Programmable Gate Array (FPGA), a microprocessor, or similar digital processing integrated circuits. The force is preferably calculated inside the digital processing integrated circuit 152 from the speed.

The digital processing integrated circuit 152 monitors the rotary actuator forces, speeds and vibration if one or more of the rotary actuators 120 are determined to be operating at undesired conditions such as undesired speeds, the digital processing integrated circuit 152 shuts down the rotary actuators 120 by disconnecting power from the rotary actuator drive circuitry 134. Undesired speeds are speeds of the rotary actuators 120 that may damage CFG 100 and any components therein. Alternatively, rather than cutting power to the rotary actuators 120, the digital processing integrated circuit 152 can be configured to adjust the rotary actuator speeds or forces to be within acceptable limits.

In the case where power is disconnected entirely, the power can be disconnected through one or both of a series switch 156a and/or a parallel switch 156b to ground. The series/parallel switch combination addresses an issue with the switch failure modes, namely the fail short and fail open conditions. Both fail short and fail open modes are detectable for both switches and only a multiple failure, namely a series fail short and a parallel fail open result in the operability of monitoring system 150 being disabled. The series/parallel combination provides for both series switch 156a and parallel switch 156b to be tested at system power-up by a simple voltage comparator and a timer. If the power bus does not come up to voltage within a specified period of time, the series switch 156a can be failed open and/or the parallel switch 156b can be failed short. If the bus voltage does not come down within a specified period of time, the series switch 156a can be failed short and/or the parallel switch 156b can be failed open. The force and speed monitoring system of FIGS. 1A and 1B is fully testable at the power up condition (e.g., PBIT). The supplementary speed sensor 154 for rotary actuator 120 can also be tested at some force or speed condition before the rotary actuator 120 is released into normal operation.

Power conditioning circuit elements 110, as illustrated, represent input power conditioning circuit elements 110. The systems in FIGS. 1A and 1B show the monitoring system 150 as an independent monitor on a dedicated printed circuit board. This particular implementation can be understood to be electronic packaging detail, and those having skill in the art will recognize that other packaging arrangements are possible.

Power conditioning circuit elements 110 as illustrated receives AVCS Power and transmits Low Voltage Power Supplies, IOSP Power Supply and Motor Power Supply (In). Power illustrated in FIGS. 1A and 1B, is electrical power and it can be in any form the component electrically requires for operation. For example, referring to FIGS. 1A and 1B, the AVCS Power is an input power that may be any form of electrical power and that can be converted to 28 Vdc. Continuing with this example, AVCS Power may be 28 Vdc, 115 Vac, 120 Vac, 200 Vac, or 270 Vdc. When the power is not in 28 Vdc, the power converted to DC voltage by routing the power through a rectifier (not shown). Rectified DC voltage can be 28 Vdc or it can be higher than 28 Vdc. Still referring to FIGS. 1A and 1B, the Motor Power Supply (Out) provides power to the CFG and may require 28 Vdc or 270 Vdc.

Figure 2:
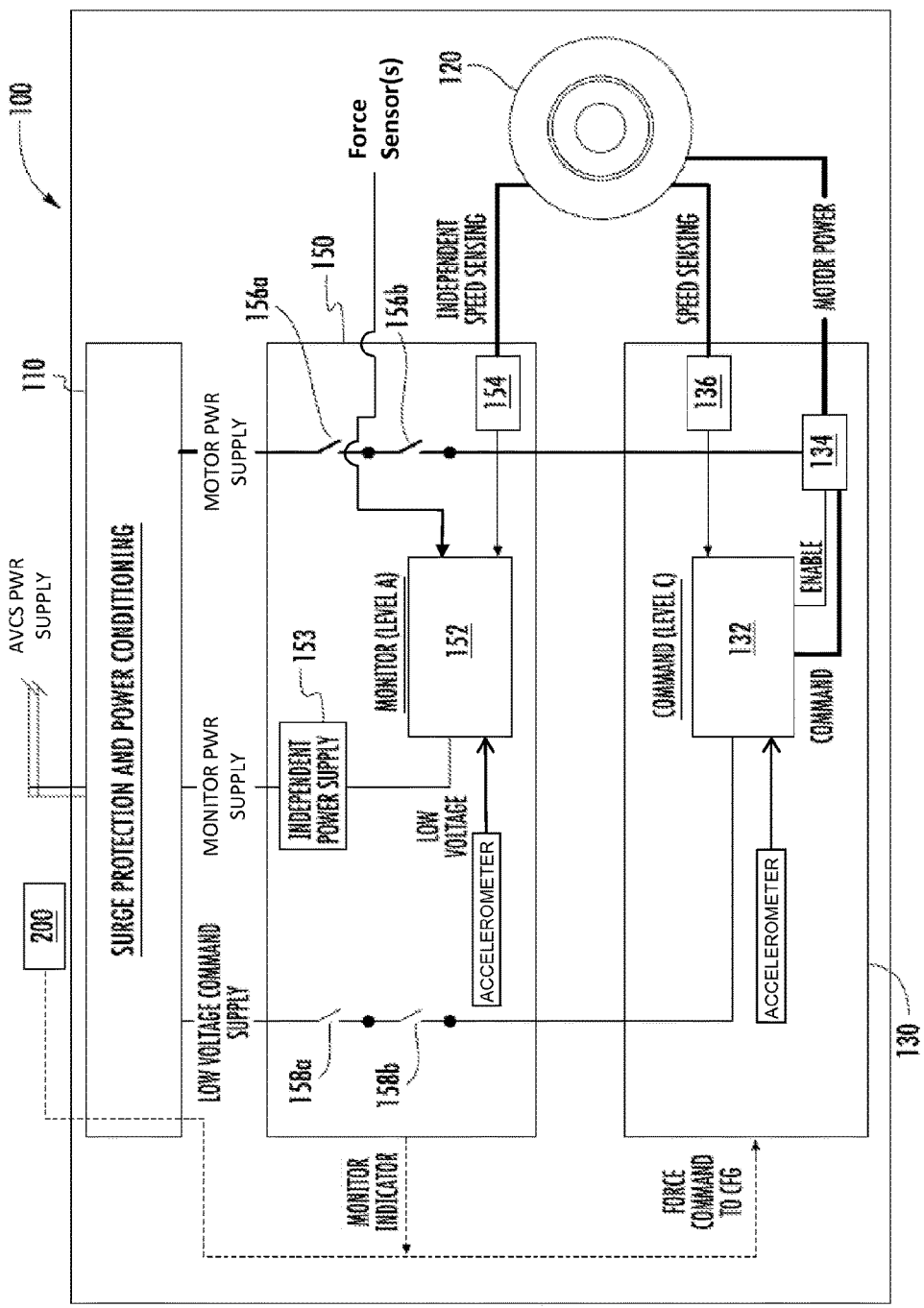
FIGS. 2-5 illustrate block diagrams of alternative active vibration control system force, speed, and vibration monitoring and control systems according to various embodiments of the presently disclosed subject matter.

Although the above description is provided with reference to the force, speed and vibration monitoring and control configuration shown in FIGS. 1A and 1B, the principles discussed hereinabove are applicable to numerous alternative embodiments. For example, FIG. 2 shows another embodiment for an independent force, speed and vibration monitor similar configured to embodiments shown in FIGS. 1A and 1B, but in which a Level A independent monitoring system 150 is added to the CFG 100. As with the embodiments shown in FIGS. 1A and 1B, this embodiment addresses underspeed or overspeed at the source, thereby requiring minor changes to existing controller and CFG software.

The embodiment illustrated in FIG. 2 includes an independent power supply 153 for independent monitoring system 150. In addition to series and parallel switches 156a and 156b that are configured the same as in FIGS. 1A and 1B, monitoring system 150 comprises a separate set of switches (e.g., two switches 158a and 158b) that interrupt the supply of power to the DSP controller 132 on the rotary actuator control block 130. In this way, operation of the CFG 100 can be discontinued by directly cutting power to the rotary actuator drive circuits 134, by cutting power to the DSP controller 132, or both power supplies can be disconnected as a redundant control. Additionally, in a variant of this embodiment, the digital processing integrated circuit 152 need not comprise a processor or FPGA. In this embodiment, no certification of the ability of the software to perform reliably in an airborne environment (e.g., DO-178 or DO-254) is required. Additionally, those having skill in the art will recognize that this system can be configured to address high vibration by adding an accelerometer to the digital processing integrated circuit 152.

Figure 3:
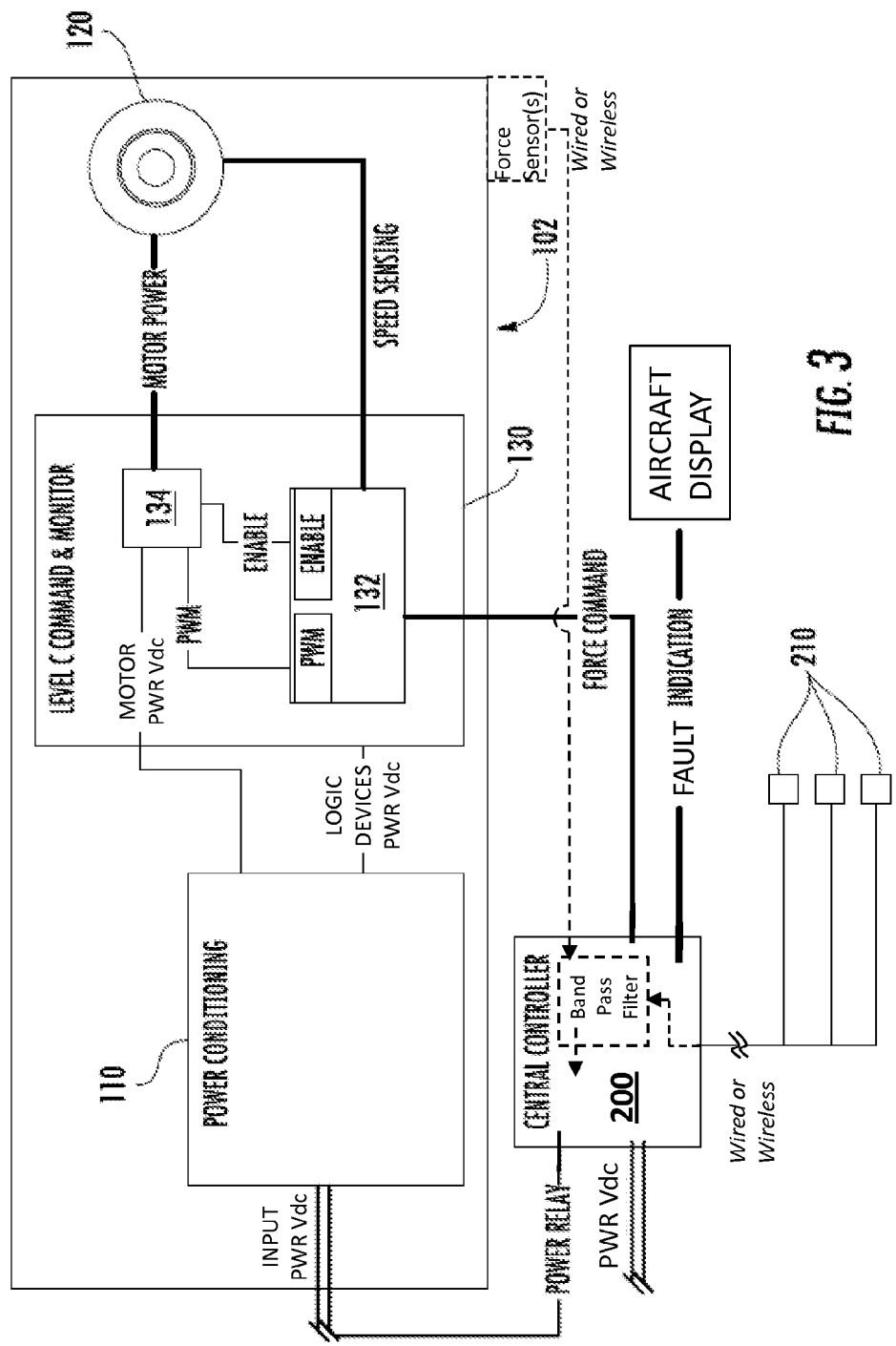

The alternative embodiment shown in FIG. 3 is another variation of the embodiments shown in FIGS. 1A and 1B. In FIG. 3, a CFG 102 is disclosed that does not include an independent speed monitoring system therein. Rather, the central controller 200 is configured to monitor for high vibration and underspeed/overspeed, and shut down power to the CFG 102 if a fault is detected. For example, the central controller 200 is configured to communicate the force, speed, or vibration fault to the aircraft so it can be indicated to the flight crew. Alternatively, one or more accelerometers 210 are in electronic communication with the central controller 200. This communication may be in a wired arrangement or in a wireless configuration. In either configuration, the central controller is configured to either cut power to the CFG 102 (e.g., by disconnecting power to power conditioning circuit elements 110) or by adjusting the rotary actuator speeds to be within acceptable or desired limits.

In this embodiment, some small changes to existing hardware and software are required. As a result, this embodiment is well-suited for aircraft integration (i.e., no added boxes or space needed) as it successfully addresses failure modes (underspeed/overspeed and incorrect force at N/Rev) at Level A, and is usable for all active vibration control systems.

Also illustrated in FIG. 3 is the alternate embodiment for the connectivity of the optional force sensors. In this alternate embodiment central controller 200 does not receive direct speed sensor information from CFG 102. Alternative force sensors supply force information to the band pass filter. As illustrated, the band pass filter is positioned within central controller 200. However, the band pass filter may be positioned anywhere between the force sensors and the central controller 200. The band pass filter converts the force input to provide speed data to the central controller 200.

Figure 4:
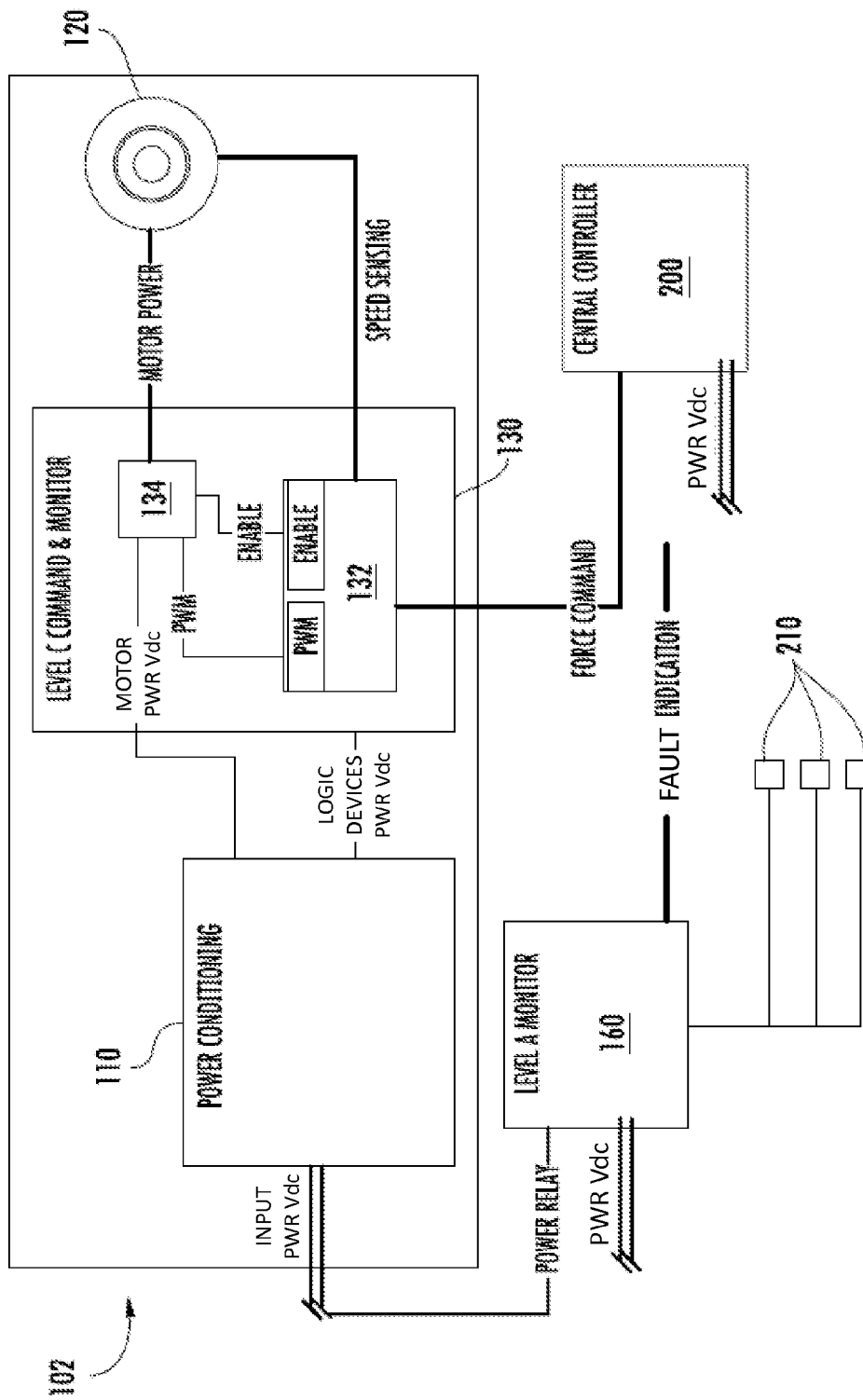

In another alternative embodiment shown in FIG. 4, another configuration for an independent speed monitor for a CFG 102 comprising a separate Level A monitor 160 is provided. In this embodiment, Level A monitor 160 is configured for monitoring high vibration and/or underspeed/overspeed and shutting down power to the CFG 102 if a fault is detected. One non-limiting example of monitoring high vibration is monitoring done via inputs from the one or more accelerometers 210. The separate Level A monitor 160 shown in FIG. 4 is capable of directly sensing the speed of the rotary actuator 120. This embodiment also adds sensors and I/O to the CFG control system.

This embodiment successfully addresses multiple failure modes (e.g., underspeed/overspeed and incorrect force at N/Rev) at Level A. In addition, this embodiment a separate Level A monitor 160 can be produced independently from the CFG 102 and the central controller 200. Additionally, this embodiment can be selectively implemented only in systems in which there is a Level A requirement. As illustrated, the separate Level A monitor 160 comprises a second central controller that is configured for use as a Level A monitor, thereby requiring adapting software in the Level A monitor 160. Such a separate monitor also is available for numerous other applications.

Figure 5:
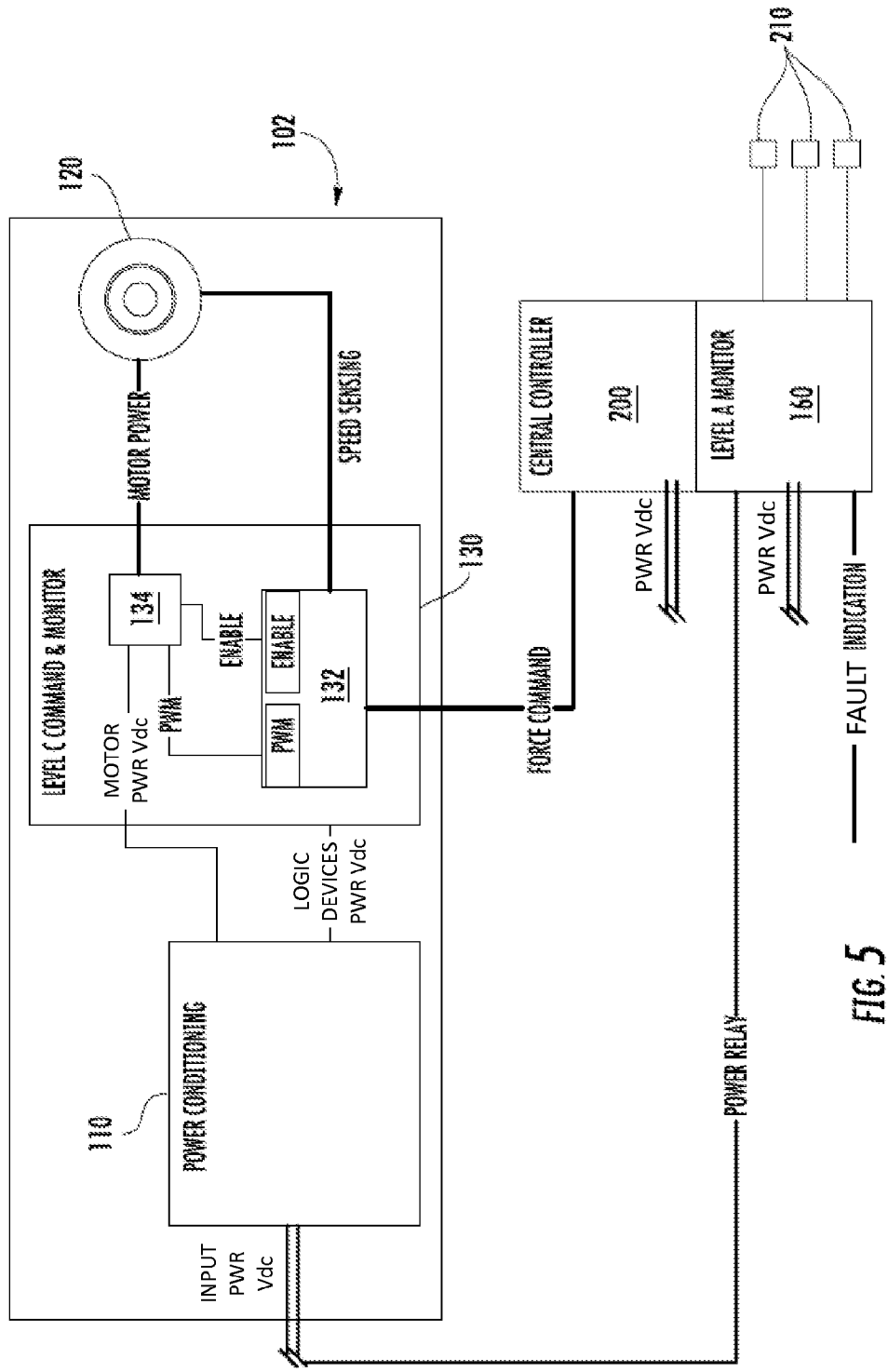

Referring to FIG. 5, another alternative embodiment is shown, where the separate Level A monitor 160 is configured to monitor for high vibration (e.g., via inputs from the one or more accelerometers 210) and/or underspeed/overspeed and shut down power to the CFG 102 if a fault is identified. In this embodiment the separate Level A monitor 160 is in electronic communication with the central controller 200 and is not independently connected to the CFG 102.

Referring to FIGS. 6A and 6B, another alternative embodiment for a hardware-only solution providing detection and reaction is provided. As shown in FIGS. 6A and 6B, monitoring is based on a drive current frequency F provided by the rotary actuator drive circuits 134 to the rotary actuator 120 rather than Hall Effect sensors. The Enable Drive element illustrated in FIG. 6A is shown as being carried by the rotary actuator drive circuits 134.

In this embodiment, the DSP controller 132 issues a frequency output for a power-up built-in test (PBIT). In FIG. 6B also includes continuous built-in test (CBIT), which is performed periodically during operation. The drive current frequency F is conditioned and converted to a corresponding drive voltage V, which is compared to one or more reference voltages that correspond to underspeed/overspeed and/or over-vibration operating conditions. FIG. 6A illustrates the non-limiting example of a test circuit 180 configured to convert the drive current frequency F to the corresponding drive voltage V. The drive voltage V is compared against a single shutdown reference voltage $V_{ref}$ corresponding to an underspeed/overspeed operating condition. If the output of the test circuit 180 indicates that the drive current frequency F is outside of acceptable limits, power to the rotary actuator 120 is disconnected. For instance, the test circuit 180 is configured to shut down power entirely to the rotary actuator drive 134 circuits or only the Enable pin of the rotary actuator drive circuits 134.

Referring to FIG. 6B, another embodiment of a test circuit 185a for hardware-only is configured to include additional logic to detect underspeed/overspeed, and over-vibration. In addition to comparing the drive voltage V against an overspeed reference voltage $V_{ref}$, the drive voltage is also be compared against two reference voltages to determine whether the rotary actuator 120 is being operated in an underspeed condition: first, the drive voltage V is compared to an enable voltage $V_{enable}$ to check that the rotary actuator 120 is in operation, and the drive voltage V is further be compared against an underspeed reference voltage $V_{und}$. If it is determined that the drive voltage V is under an acceptable value despite being in operation, power to the rotary actuators 120 is disconnected, or the DSP controller 132 is configured to adjust the rotary actuator speeds to be within acceptable limits.

To test for over-vibration, a signal from at least one of the one or more accelerometers 210 is converted to a corresponding accelerometer voltage $V_{acc}$, which is compared against an over-vibration reference voltage $V_{vib}$. If it is determined that the signal from the one or more accelerometers 210 corresponds to an unacceptable vibration level, power to the rotary actuators 120 is disconnected, or the DSP controller 132 is configured to adjust the rotary actuator speeds to be within acceptable or desired limits. According to the logic table shown in FIG. 6C, all of these comparisons are made concurrently to determine whether the operation of the rotary actuator 120 needs to be disabled or at least modified.

In either of the configurations shown in FIG. 6A or 6B (or in similar hardware-only testing configurations), the test circuit can be separated from the rotary actuator drive logic (e.g., separate from the DSP controller 132). A non-limiting example has the test circuit residing on the rotary actuator drive output board.

It should be understood that the same embodiment can be adapted for two or more rotary actuators 120. FIG. 6B shows a second rotary actuator logic block 185b that can be gated with the test circuit 185a (e.g., at the over-vibration detection). In any embodiment, a hardware-only monitoring and control system keeps the fault logic at low voltage and separated from the rotary actuator drive logic, and thus it does not complicate the input power. This embodiment does not require any complex devices for 254 certification, and it provides for built-in test (BIT) in all conditions. BIT is an important function for Level A systems. Level A systems require there be no latent faults that are not found for a long period of time. Acceptable Level A BIT can be power up (PBIT), continuous (CBIT), or initiated BIT (IBIT).

Regardless of the particular embodiment for independent force, speed, and vibration monitoring system, the flight critical (i.e., Level A) designation for the CFG control system must undergo a quality assurance, certification, and verification regimen. In order to minimize the verification efforts, the present subject matter can further comprise an independent monitoring method that is as simple and applicable to all configurations.

Figure 7:
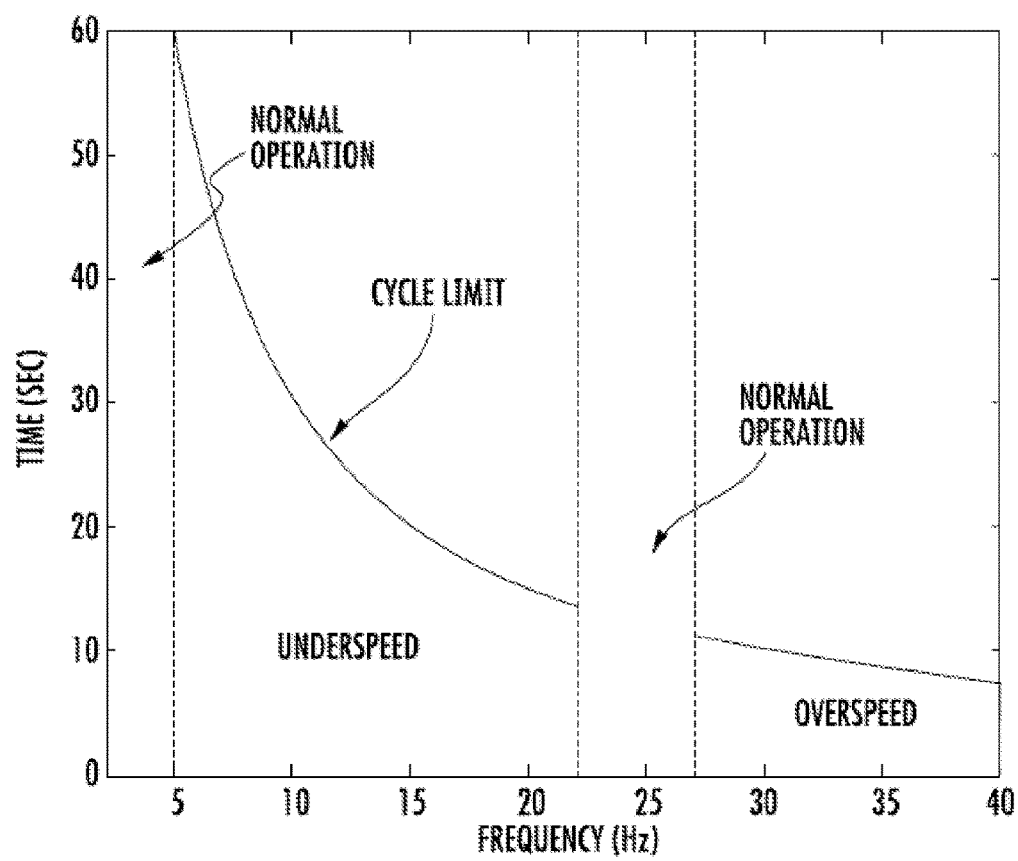
FIG. 7 is a graph illustrating in-band and out-of-band ranges in which rotary actuators can operate according to an embodiment of the presently disclosed subject matter.

FIG. 7 illustrates the system operational frequency spectrum being divided up in a complicated way between 'in-band' and 'out-of-band' bins. These 'in-band' and 'out-of-band' bins make the monitoring method difficult to achieve. The different bandwidth 'bins' in FIG. 7 are defined within the frequency spectrum which the rotary actuators operate. Each bin carries with it the requirement to measure multiple boundary conditions. When the speed is in an "incorrect" frequency zone, the monitor counts the number of cycles. A counter counts down when in a normal operating frequency zone but at slower rate (e.g., count down 1 count per 25 cycles). The counter is reset when unit is power cycled. If the counter exceeds a maximum cycle limit, an incorrect frequency fault is triggered, and the corresponding CFG is optionally shut down. Incorrect frequency zones and cycle limit are tuned for different helicopters. For instance, frequency zones can be specified with 1 Hz resolution, and a cycle count limit can be specified from 1 to 1024.

Referring again to FIG. 7, if the actuator motor is operating within the bandwidth defined as bin 0, a measurement is made to ensure that the rotary actuator is operating within a range of frequencies corresponding to that bandwidth (e.g., above 5 Hz and below 12 Hz). If multiple parallel speed threshold detectors are operated simultaneously, the numerous threshold detector outputs are monitored by a secondary process, and the verification process is burdened by the need to evaluate $2^N$ paths through the secondary process, where N is the number of parallel detectors. In addition to the resources required to define each threshold, namely numerical speed vectors, such evaluations impose further complexity on the system. The verification complexity burden proliferates whether dedicated detectors are used or if a single detector is used with a complicated bin compare function. This problem is further compounded if multiple rotary actuators must be monitored by a single monitoring system resulting in a test vector proliferation of as much as $2 \times 2^N$.

It is desirable to simplify the bin boundary detection logic and simplify how the overall operating frequency bandwidth is divided up into acceptable and undesired operating frequency bands. Such a method is easily verifiable, minimizing the logical resources and frequency definition vectors that the system is required to manage, and saves development expenses. This simplified method is easily adaptable to multiple applications with differing bin definitions across the system operating frequency without imposing the need for re-verification and certification of the logic.

Figure 8:
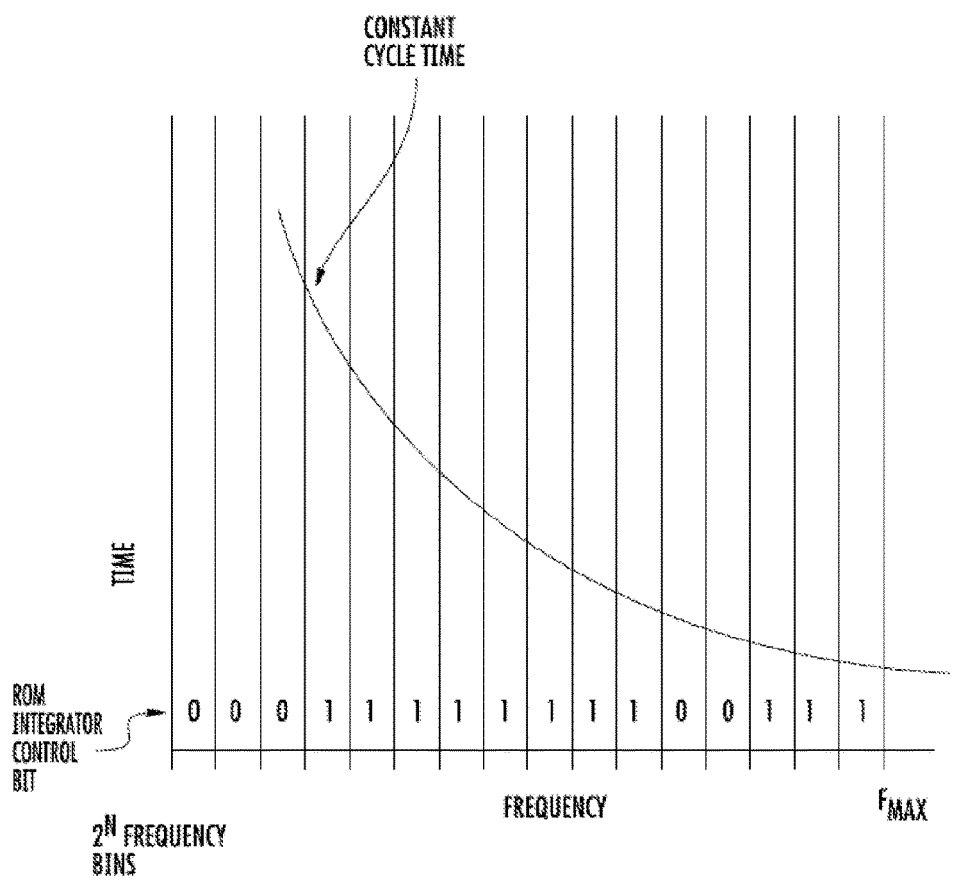
FIG. 8 is a graph illustrating the structure of a simplified speed monitoring method according to an embodiment of the presently disclosed subject matter.

FIG. 8 provides a plot defining the structure of such a simplified speed monitoring method. The plot divides the operating frequency range of a vehicle into an arbitrary number of frequency bins. For the sake of convenience and simplicity, the number of bins is defined in the form of $2^N$. Each of the $2^N$ bins have associated with it a binary digit, a 1 or a 0, which designates whether the bin represents an undesired operating frequency range or an acceptable operating frequency range. The binary digits associated with the frequency bins is stored in a $2^N$ deep Read Only Memory (ROM), or is defined by pin strapping $2^N$ General Purpose Input Output (GPIO) pins on the digital processing integrated circuit 152. The latter method, namely pin strapping the vector via GPIO, has an advantage of allowing the digital processing integrated circuit 152 to be applied in multiple product applications without re-certification of the logic.

The method indicated in FIG. 8 is defined as follows. Associated with each rotating actuator in the system is a dedicated frequency detector. The frequency detector comprises a binary digital counter that measures the frequency of the rotating actuator by counting reference oscillator cycles between consecutive rotary actuator index pulses. The bins of the system correspond to the most significant bits of the binary counter. For example, if the binary counter is a fifteen bit counter, the most significant 3 bits of the counter can associate with 8 frequency bins to define "forbidden" and "acceptable" operating frequency ranges of the system. The reference oscillator frequency is selected so as to make the frequency bin boundaries of FIG. 8 fall on convenient numbers. For example, if a reference oscillator frequency of 32.768 kHz is selected (i.e., $2^{15}$ Hz), the operating frequency bandwidth of the system is divided into 2N bins such that the bin boundaries fall on frequency values that are convenient for the system. In one non-limiting example, if N=3, the operating bandwidth of the system is divided into 8 bins (i.e., $2^N=8$) with boundaries as defined in the following Table 1.

TABLE 1

| Reference Oscillator Cycles | Bin Number | Motor Speed Range |
|---|---|---|
| 28672-32767 | $2^N - 1$ | 1 < f < 1.14 Hz |
| 24576-28671 | $2^N - 2$ | 1.14 < f < 1.33 Hz |
| 20480-24575 | $2^N - 3$ | 1.33 < f < 1.6 Hz |
| 16384-20479 | 4 | 1.6 < f < 2 Hz |
| 12288-16383 | 3 | 2 < f < 2.66 Hz |
| 8192-12287 | 2 | 2.66 < f < 4 Hz |
| 4096-8191 | 1 | 4 < f < 8 Hz |
| 0-4095 | 0 | f > 8 Hz |

While the bin boundaries become coarse in the lower bin numbers corresponding to the higher frequencies of the system, the detector is easily be scaled up to nearly arbitrary resolution for the system by increasing N, with little or no effect in terms of increased complexity to the system. It should be clear that the ability to resolve 'in-band' and 'out-of-band' operating frequencies in the system is a function of N and the oscillator frequency.

The index pulses are used to provide an estimate of the speed and phase position for each rotor, which can then be used to estimate the force. Equation (1) illustrates how to compute the force of one rotor.

$$F = mr\omega^2 \cos(\omega t + \varphi) \qquad \text{Eq (1)}$$

In Equation 1 m is an imbalance mass, r is the radius, $\omega$ is the rotational speed, t is time and $\varphi$ is rotational phase position of mass.

Figure 9:
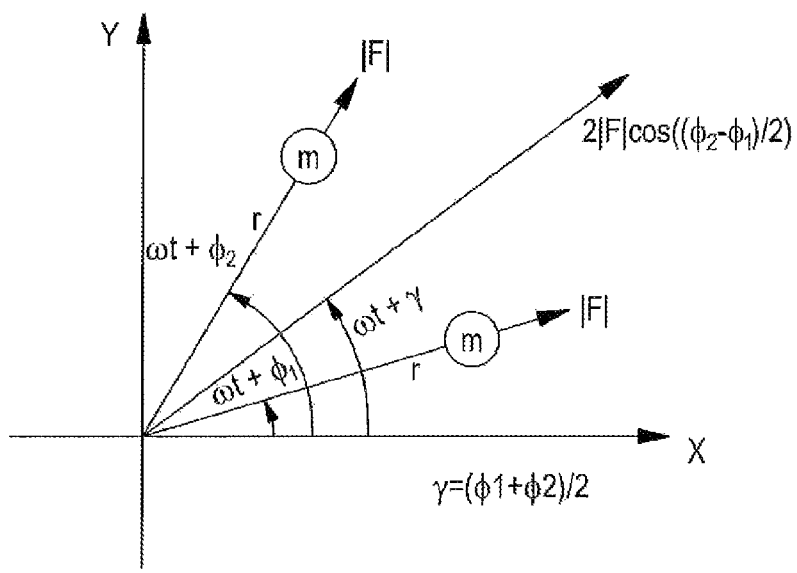
FIG. 9 illustrates force generation using a force generator with two corotating imbalanced rotors to create a circular force with controllable magnitude and phase, thereby providing a CFG.

FIG. 9 illustrates a way to compute the force output of 2 rotors (a CFG). In FIG. 9 phase $\varphi$ of a first imbalanced mass within the CFG with respect to a second imbalanced mass within the CFG (i.e., the relative phase) determines the magnitude of resultant rotating force vector. The resulting force in a zero-force case and a full-force case of imbalance masses of the CFG is illustrated in FIG. 9. In the zero-force case the relative phase $\varphi_2 - \varphi_1$ is 180 degrees and resulting force rotating vector has a magnitude of zero. In the full-force case, the relative phase $\varphi_2 - \varphi_1$ is 0 degrees and resulting rotating force vector has a maximum magnitude of 2|F|. For relative phases $\varphi_2 - \varphi_1$ between 0 and 180 degrees, the magnitude of resulting rotating force vector will be between zero and the maximum. The collective phase $\gamma$ of rotating force vector can be varied to provide phasing between CFGs. Through control of phase $\phi$ of each imbalance mass in the CFG has the magnitude and absolute phase of the rotating force vector produced by CFG can be controlled.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. An active vibration control system (AVCS) for one or more force generator monitoring and control comprising:
   a rotary actuator control system in communication with one or more force generators, the rotary actuator control system configured to execute an active vibration control routine and to control the one or more force generators based on one or more first sensor signals received from a first sensing circuit of the rotary actuator control system; and
   an independent monitoring system operationally separated from the rotary actuator control system, the independent monitoring system configured to receive one or more sensor signals from a second sensing circuit of the independent monitoring system to monitor operating conditions of the one or more force generators, independently from the rotary actuator control system the independent monitoring system is configured to compare the one or more sensor signals to one or more reference signals corresponding to an under speed, an over speed, an over-vibration operating condition, and/or an incorrect force and shut down or adjust the operating condition of the one or more force generators in response to the comparison when the one or more force generators are exceeding an operating limit and operating at undesired conditions consisting of force, speed, vibration and combinations thereof, wherein the operating limit is based upon the design of the one or more force generators.

2. The AVCS according to claim 1, wherein the independent monitoring system is provided on a dedicated printed circuit board.

3. The AVCS according to claim 2, wherein the dedicated printed circuit board is co-located with the one or more force generators.

4. The AVCS according to claim 1, wherein the one or more second sensor signals comprise index pulses, and wherein the independent monitoring system is configured for detecting at least one speed of the one or more force generators based on the index pulses.

5. The AVCS according to claim 4, wherein the independent monitoring system is configured to detect an under speed and an over speed operating condition based on the index pulses.

6. The AVCS according to claim 1, wherein the one or more second sensor signals comprise index pulses, and wherein the independent monitoring system is configured for using the index pulses to estimate a force of the one or more force generators.

7. The AVCS according to claim 6, wherein the independent monitoring system is configured to detect an inadequate force and an excessive force operating condition based on the index pulses.

8. The AVCS according to claim 1, wherein the independent monitoring system is capable of detecting vibration.

9. The AVCS according to claim 8, further comprising at least one accelerometer associated with each of the force generators, the accelerometers providing input to the independent monitoring system.

10. The AVCS according to claim 1, wherein the independent monitoring system is provided to monitor speed and vibration, and the independent monitoring system is capable of estimating force.

11. The AVCS according to claim 1, wherein the independent monitoring system is provided to estimate speed of the force generator using a detected operating condition based upon measured vibration or measured force.

12. The AVCS according to claim 1, wherein the rotary actuator control system comprises:
   a digital signal processor (DSP) controller in communication with the independent monitoring system; and
   one or more rotary actuator drive circuits in communication with the digital signal processor and with the one or more force generators.

13. The AVCS according to claim 1, wherein the independent monitoring system is provided as a separate Level A monitor attached to the central controller.

14. The AVCS according to claim 1, wherein the independent monitoring system is in communication with the one or more force generators.

15. The AVCS according to claim 1, wherein the one or more second sensor signals comprise index pulses that are provided to the independent monitoring by one of a wired sensor or a wireless sensor.

16. The AVCS according to claim 1, wherein the one or more second sensor signals comprise index pulses that comprise dedicated index pulses provided only to the independent monitoring system.

17. The AVCS according to claim 1, wherein the one or more second sensor signals comprise index pulses that comprise one or more of a force or speed measurement.

18. The AVCS according to claim 17, wherein the first sensing circuit comprises one or more Hall-effect sensors in communication with the one or more force generators, and wherein the independent monitoring system is configured to receive the index pulses from the one or more Hall-effect sensors in communication with the one or more force generators, wherein the index pulses comprise rotary actuator speed data.

19. The AVCS according to claim 17, wherein the first sensing circuit comprises one or more accelerometers, and wherein the independent monitoring system is configured to receive the index pulses from the one or more accelerometers, wherein the index pulses comprise vibration data.

20. The AVCS according to claim 19, wherein the independent monitoring system is configured to shut down the one or more force generators if a voltage corresponding to the index pulses from one or more accelerometers exceeds one or more reference voltages associated with the one or more force generators operating at undesired speeds.

21. The AVCS according to claim 1, wherein the one or more second sensor signals comprise index pulses that comprise a drive current provided to the one or more force generators.

22. The AVCS according to claim 21, wherein the independent monitoring system is configured to shut down the one or more force generators if a voltage corresponding to the drive current provided to the one or more force generators exceeds one or more reference voltages associated with the one or more force generators operating at undesired speeds.

23. A method for active vibration control system (AVCS) monitoring and control, the method comprising:
   operating a rotary actuator control system to execute an active vibration control routine using one or more force generators based on one or more first sensor signals received from a first sensing circuit of the rotary actuator control system, wherein the rotary actuator control system is in communication with the one or more force generators;
   receiving, at an independent monitoring system operationally separated from the rotary actuator control system, one or more second sensor signals received from a second sensing circuit of the independent monitoring system to monitor operating conditions of the one or more force generators;

comparing the one or more second sensor signals to one or more reference signals corresponding to an under speed, an over speed, and/or an over-vibration operating condition; and shutting down or adjusting, at the independent monitoring system and independently from the rotary actuator control system, the one or more force generators in response to determining, based on the one or more second sensor signals, that the one or more force generators are operating at undesired conditions consisting of force, speed, vibration and combinations thereof.

24. The method of claim 23, wherein the independent monitoring system is in communication with the one or more force generators.

25. The method of claim 23, wherein at least one of the one or more second sensor signals received by the independent monitoring system includes index pulses, wherein receiving the index pulses comprises receiving dedicated index pulses provided only to the independent monitoring system.

26. The method of claim 25, wherein receiving the index pulses comprises receiving a drive current provided to the one or more force generators.

27. The method of claim 25, wherein comparing the index pulses to one or more reference signals comprises comparing a voltage corresponding to the drive current provided to the one or more force generators to one or more reference voltages associated with the one or more force generators operating at undesired conditions.

28. The method of claim 25, wherein receiving index pulses comprises receiving the index pulses at a dedicated frequency detector; and wherein comparing the index pulses to one or more reference signals comprises measuring the frequency of the rotating actuator and determining whether the frequency falls within one of a plurality of frequency bins that represents an acceptable operating frequency range.

29. The method of claim 25, wherein at least one of the one or more second sensor signals received by the independent monitoring system includes index pulses, wherein the method comprises using the index pulses to estimate a force.

30. The method of claim 29, wherein the dedicated frequency detector comprises a binary digital counter; and wherein measuring the frequency of the rotating actuator comprises counting reference oscillator cycles between consecutive rotary actuator index pulses.

31. The method of claim 29, wherein the one or more second sensors signals comprise one or more of a force, speed, or vibration measurement, wherein the method comprises using the index pulses for monitoring the speed of the force generators and estimating the force associated with each of the force generators, wherein the method comprises receiving input from an accelerometer to the independent monitoring system to determine vibration of the force generators.

* * * * *